US008787754B1

(12) United States Patent  
Beckett et al.

(10) Patent No.: US 8,787,754 B1  
(45) Date of Patent: Jul. 22, 2014

(54) RAPID CALCULATION OF NONLINEAR OPTICAL TRANSMISSION IMPAIRMENTS

(71) Applicants: Douglas James Beckett, Kanata (CA); Nourhan Eid, Ottawa (CA); Michael Reimer, Stittsville (CA); Xuefeng Tang, Ottawa (CA); Maurice O'Sullivan, Ottawa (CA)

(72) Inventors: Douglas James Beckett, Kanata (CA); Nourhan Eid, Ottawa (CA); Michael Reimer, Stittsville (CA); Xuefeng Tang, Ottawa (CA); Maurice O'Sullivan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 69 days.

(21) Appl. No.: 13/665,318

(22) Filed: Oct. 31, 2012

(51) Int. Cl.
*H04B 10/25* (2013.01)
(52) U.S. Cl.
USPC ............................................. 398/29; 398/147
(58) Field of Classification Search
CPC ............. H04B 10/2513; H04B 10/255; H04B 10/2557; H04B 10/2563; H04B 10/2543
USPC ..................................... 398/29, 47
See application file for complete search history.

(56) References Cited

U.S. PATENT DOCUMENTS

| 7,027,740 | B2 * | 4/2006 | Essiambre et al. | 398/147 |
| 8,417,080 | B2 * | 4/2013 | Wei | 385/123 |
| 2011/0236032 | A1 * | 9/2011 | Bickham et al. | 398/147 |

* cited by examiner

*Primary Examiner* — Leslie Pascal  
(74) *Attorney, Agent, or Firm* — Kent Daniels; Daniels IP Services Ltd.

(57) ABSTRACT

A method of estimating nonlinear transmission impairments of an Optical Channel (OCh) trail in an optical communications network. A per-span nonlinear field variance is calculated for each span of the trail. The per-span nonlinear field variance represents nonlinearly induced noise due to the transmission impairments of that span. The nonlinearly induced noise being imparted to a signal transmitted through the trail and detected by the receiver. A respective covariance between the nonlinear fields contributed by each span pair of the OCh trail is computed. The covariance represents the correlation of the nonlinearly induced noise imparted to the signal within the first span of a span pair with the nonlinearly induced noise imparted to the signal within the second span of the pair. A covariance matrix is populated using the computed per-span variance values and covariance values. A total nonlinear field variance is computed by summing over the covariance matrix elements.

9 Claims, 9 Drawing Sheets

Figure 2

|  | span 1 | span 2 | span 3 | ... | span i | span i+1 | span i+2 | ... |
|---|---|---|---|---|---|---|---|---|
| span 1 | $\sigma_1^2$ | $<X_1,X_2^*>$ | $<X_1,X_3^*>$ | ... | $<X_1,X_i^*>$ | $<X_1,X_{i+1}^*>$ | $<X_1,X_{i+2}^*>$ | ... |
| span 2 | $<X_2,X_1^*>$ | $\sigma_2^2$ | $<X_2,X_3^*>$ | ... | $<X_2,X_i^*>$ | $<X_2,X_{i+1}^*>$ | $<X_2,X_{i+2}^*>$ | ... |
| span 3 | $<X_3,X_1^*>$ | $<X_3,X_2^*>$ | $\sigma_3^2$ | ... | $<X_3,X_i^*>$ | $<X_3,X_{i+1}^*>$ | $<X_3,X_{i+2}^*>$ | ... |
| ... | | | | | | | | |
| span i | $<X_i,X_1^*>$ | $<X_i,X_2^*>$ | $<X_i,X_3^*>$ | ... | $\sigma_i^2$ | $<X_i,X_{i+1}^*>$ | $<X_i,X_{i+2}^*>$ | ... |
| span i+1 | $<X_{i+1},X_1^*>$ | $<X_{i+1},X_2^*>$ | $<X_{i+1},X_3^*>$ | ... | $<X_{i+1},X_i^*>$ | $\sigma_{i+1}^2$ | $<X_{i+1},X_{i+2}^*>$ | ... |
| span i+2 | $<X_{i+2},X_1^*>$ | $<X_{i+2},X_2^*>$ | $<X_{i+2},X_3^*>$ | ... | $<X_{i+2},X_i^*>$ | $<X_{i+2},X_{i+1}^*>$ | $\sigma_{i+2}^2$ | ... |
| ... | | | | | | | | |

Figure 3

|  | span 1 | span 2 | span 3 | ... | span i | span i+1 | span i+2 | ... |
|---|---|---|---|---|---|---|---|---|
| span 1 | 1 | $p_{1,2}$ | $p_{1,3}$ | ... | $p_{1,i}$ | $p_{1,i+1}$ | $p_{1,i+2}$ | |
| span 2 | $p_{2,1}$ | 1 | $p_{2,3}$ | ... | $p_{2,i}$ | $p_{2,i+1}$ | $p_{2,i+2}$ | |
| span 3 | $p_{3,1}$ | $p_{3,2}$ | 1 | ... | $p_{3,i}$ | $p_{3,i+1}$ | $p_{3,i+2}$ | |
| ... | | | | | | | | |
| span i | $p_{i,1}$ | $p_{i,2}$ | $p_{i,3}$ | ... | 1 | $p_{i,i+1}$ | $p_{i,i+2}$ | |
| span i+1 | $p_{i+1,1}$ | $p_{i+1,2}$ | $p_{i+1,3}$ | ... | $p_{i+1,i}$ | 1 | $p_{i+1,i+2}$ | |
| span i+2 | $p_{i+2,1}$ | $p_{i+2,2}$ | $p_{i+2,3}$ | ... | $p_{i+2,i}$ | $p_{i+2,i+1}$ | 1 | |
| ... | | | | | | | | |

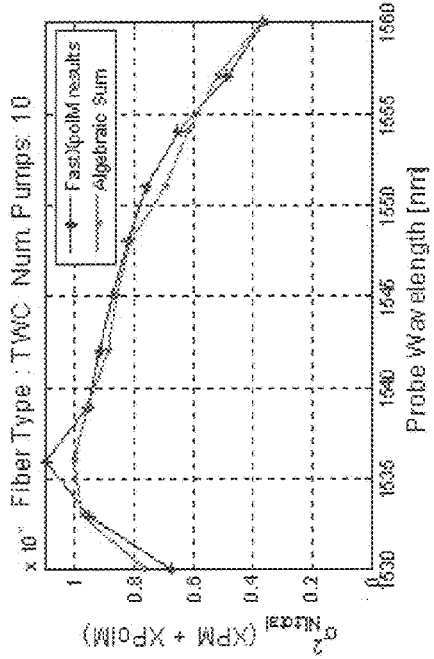
Figure 5A
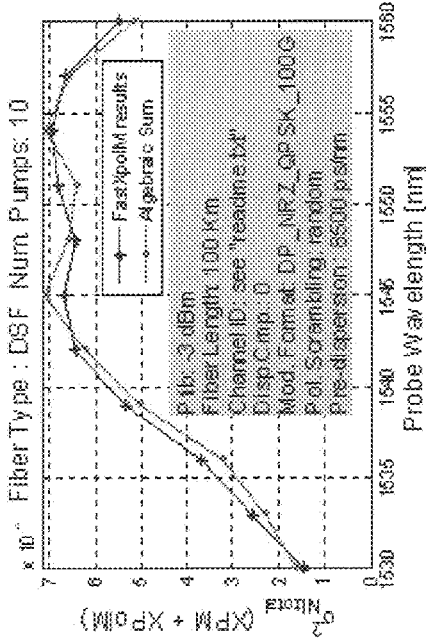
Figure 5B
Figure 5C
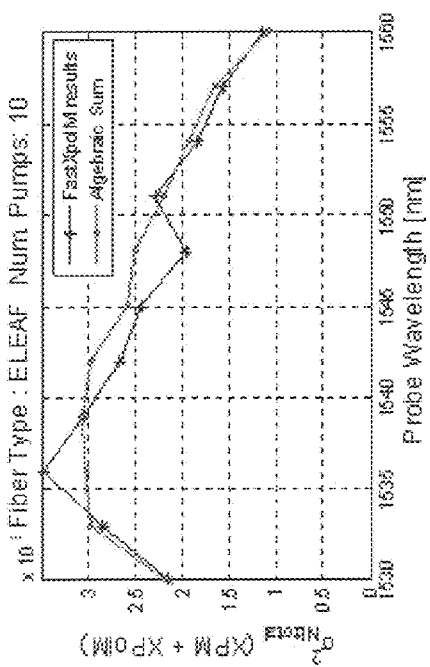
Figure 5D

RAPID CALCULATION OF NONLINEAR OPTICAL TRANSMISSION IMPAIRMENTS

CROSS-REFERENCE TO RELATED APPLICATIONS

This is the first application filed in respect of the present invention.

FIELD OF THE INVENTION

The present application relates generally to management of optical transmission systems, and more specifically, to methods of rapid calculation of nonlinear optical transmission impairments.

BACKGROUND

An optical transmission system typically comprises a transmitter (Tx) and a receiver (Rx) interconnected by an optical fiber link which may be composed of one or more fiber spans. Adjacent spans are commonly interconnected by an optical amplifier (such as an Erbium Doped Fiber Amplifier, EDFA). Other optical equipment, such as optical add-drop multiplexers (OADMs), for example, may also be installed between adjacent spans of the optical fiber link.

It is often desirable to know the magnitude of nonlinear optical impairments in an optical transmission system. These impairments, including cross-phase modulation (XPM), self-phase modulation (SPM), cross-polarization modulation (XPolM), and four wave mixing (FWM), are needed to estimate various link budget parameters, including the required optical signal-to-noise ratio (ROSNR) to achieve a specified bit-error-ratio at the Rx, and the signal power at the input to each optical fiber span that maximizes the received net system margin. The calculation of these parameters is a normal part of validating a planned link between a given Tx/Rx pair.

Traditional methods of nonlinear impairment calculation often employ a split-step Fourier (SSF) solution of the nonlinear Schrodinger equation (NLSE). SSF propagation simulations require the calculation of optical nonlinearities in the time domain (i.e. using a waveform of optical field versus time) in tandem with linear propagation through dispersive optical fiber in the frequency domain (i.e. a spectrum of the optical field versus optical frequency). Conversion from time-domain to frequency-domain is commonly performed using the fast Fourier-transform (FFT) algorithm. In order to ensure the accuracy of the propagated optical field, the nonlinear optical phase and chromatic dispersion must be calculated sequentially and repeatedly after short propagation distances. This may require hundreds of calculation steps for each span of fiber, with each step often requiring two FFT calculations.

There are other known methods for calculating nonlinear impairments, but a common theme is the repeated use of FFTs.

In an optical network being designed via an optical planning tool (OPT), there may be tens of thousands of optical channel (OCh) trails that require validation. Each trail represents an optical channel link between a given Tx/Rx pair. Using SSF propagation simulations and related calculations, the validation process may take minutes per OCh trail, and many hours for a network. Often, this is unacceptably long for OPT users, and also too long for automated use in path-validation algorithms within optical control planes (OCPs).

Techniques that enable rapid validation of optical channel trails remain highly desirable.

SUMMARY

An aspect of the present invention provides a method of estimating impairments of an Optical Channel (OCh) trail between a transmitter and a receiver in an optical communications network. A respective per-span nonlinear field variance is calculated for each span of the OCh trail. The per-span nonlinear field variance quantifies the nonlinearly induced noise due to the transmission impairments of the respective span. The nonlinearly induced noise representing the distortion imparted to a signal transmitted through the OCh trail and detected by the receiver. A respective covariance between the nonlinear fields contributed by each span pair of the OCh trail is computed. The covariance represents the nonlinearly induced noise imparted to the signal within the first span of the span pair, due to transmission impairments of the other, preceding span of the span pair. A covariance matrix is populated using the computed per-span variance values and covariance values. The total nonlinear field variance is computed by summing over the covariance matrix elements.

BRIEF DESCRIPTION OF THE DRAWINGS

Further features and advantages of the present invention will become apparent from the following detailed description, taken in combination with the appended drawings, in which:

FIG. 2 illustrates a representative covariance matrix;

FIG. 3 is a matrix of Pearson correlation ratios applicable for the calculation of the covariance matrix of FIG. 2;

FIGS. 5A-5D are charts comparing total variance computed using a conventional method with total variance computed using methods in accordance with the present invention;

It will be noted that throughout the appended drawings, like features are identified by like reference numerals.

DETAILED DESCRIPTION

Figure 1:
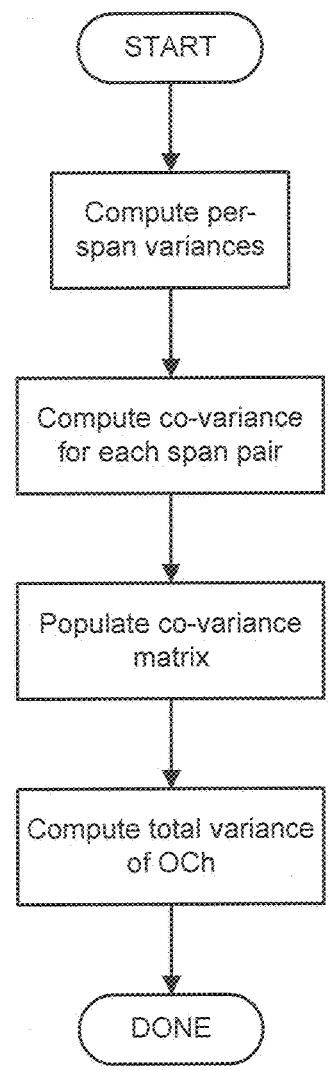
FIG. 1 is a flow-chart illustrating principal steps in a process for calculating the total noise due to impairments of an Optical Channel trail.

The present application provides techniques for the rapid calculation of the nonlinear field variance, on the order of 100 times faster than is possible using conventional SSF-based methods. The present techniques leverage the observations that, with acceptable accuracy: nonlinear impairments can be represented as a nonlinear field variance; nonlinear field variance contributions scale with optical power, P, through a known power scaling-rule, such as $P^2$, and the nonlinear field variances that result within a channel and from interfering channels can be added independently. FIG. 1 is a flow-chart illustrating principal steps in a process for calculating the total nonlinear field variance due to impairments of an Optical Channel trail.

As may be seen in FIG. 1, the respective per-span nonlinear field variance, representing the variance of the nonlinear field imparted to the signal and detected by the receiver, is computed for each span of the OCh trail. A respective covariance between each pair of spans in the OCh trail is then computed. This covariance characterizes the statistical correlation between the nonlinear fields imparted to the signal within any two spans of the OCh trail. A covariance matrix is then populated using the computed per-span variance and covariance values. The total nonlinear field variance due to impairments of the OCh trail is then computed by summing over all elements of the covariance matrix.

The total nonlinear field variance of an optical signal propagated through multiple spans of fiber may be calculated as the sum of the nonlinear field covariances over all pair-wise combinations of spans in the OCh trail, for all nonlinear interactions contributing to the total nonlinear field.

By representing the strength of nonlinear impairments as a covariance matrix between pair-wise combinations of fiber spans, the present technique avoids SSF calculations at the time of OCh trail validation. Also, summing the elements of the covariance matrix is typically much faster than numerical evaluation of FFTs. Both of these factors contribute to a significant reduction in the time required to validate an OCh trail using the present technique, as compared to conventional methods.

To further enable rapid calculation, each element of the covariance matrix for each sequence of fiber types in an OCh trail can be constructed using functions or lookup-tables based on accessible attributes of the OCh trail. Empirical parametric functions based on a limited set of pre-calculations of nonlinear behaviours may be used to populate the elements of the covariance matrices using only inventory information such as the accumulated chromatic dispersion at the input of the relevant fiber span, as well as the modulation format and symbol-rate of each interfering channel. However, it is preferable to develop functions based on the above-noted inventory information plus physical attributes of the fiber, such as: the effective area of each fiber; the dispersion and dispersion-slope in each span; and the relative group delays of the signal and interferers between each span pair.

As will be described in greater detail below, conventional SSF-based techniques may be used, for example in a pre-processing step, to develop empirical and/or physics-based universal curve functions that can subsequently be used to enable rapid population of the covariance matrices during OCh trail validation.

Covariance Matrix Summation—Span-by-Span

Consider the following descriptions of transmission signals in an optical fiber:

Let $\vec{\epsilon}_i(t)$ be the time-series of the Optical field vector at the output of span i; and Let $\vec{E}_i(t)$ be the time-series of the Optical field vector at the output of span i, following coherent detection by the Receiver, Rx, and post-compensated for the total dispersion D accumulated up to that point, as depicted in EQ 1

$$\vec{E}_i(t) = D_T^{-1}[Rx[\vec{\epsilon}_i(t)]] \qquad \text{EQ 1}$$

Note that in this instance "detected" includes the application of net linear Rx transfer functions with carrier recovery.

Next, define in EQ 2 the nonlinear field $\vec{X}_i(t)$ as the change in the received, post-compensated, optical field after each span i:

$$\vec{X}_i(t) \stackrel{def}{=} \vec{E}_i(t) - \vec{E}_{i-1}(t) \qquad \text{EQ 2}$$

The quantity of interest is the total nonlinear field after N spans, which is exactly the vector sum of the nonlinear optical fields contributed by each fiber span, as shown in EQ 3:

$$\vec{X}_N(t) \stackrel{def}{=} \vec{E}_N(t) - \vec{E}_0(t) = \sum_{i=1}^{N} \vec{X}_i(t) \qquad \text{EQ 3}$$

where $\vec{E}_0(t)$ is the optical field at the output of the transmitter, affected by the Receiver transfer function and with appropriate electronic post-compensation of the accumulated chromatic dispersion. The interaction between nonlinearities contributed by differing fiber spans is included within the definition of $\vec{X}_i(t)$.

Next, the contributions of the orthogonal X and Y-polarization to the total nonlinear optical field variance are considered to be independent. The total nonlinearly induced noise on the received signal contributed by a single polarization therefore has variance given by EQ 4:

$$\begin{aligned}
\sigma_N^2 &= \text{var}[X_N(t)] \qquad \text{EQ 4}\\
&= \text{var}\left[\sum_{i=1}^{N} X_i(t)\right]\\
&= \sum_{i=1}^{N} \sum_{j=1}^{N} \langle X_i X_j^* \rangle\\
&= \sum_{i=1}^{N} \langle X_i X_j^* \rangle + \sum_{i \neq j}^{N} \sum_{j=1}^{N} \langle X_i X_j^* \rangle\\
&= \sum_{i=1}^{N} \text{var}(X_i) + \sum_{i=1 \neq j}^{N} \sum_{j=1}^{N} \text{cov}\langle X_i, X_j^* \rangle
\end{aligned}$$

Here, $\langle X_i X_i^* \rangle = \sigma_i^2$ is the per-span nonlinear field variance at span i, $\langle X_i X_j^* \rangle$ is the covariance between the nonlinear fields produced within spans i and j, while $\langle \ldots \rangle$ represents an expected value over independent realizations of the nonlinear processes. The expectation of the nonlinear optical field $\vec{X}_i(t)$ is zero, $\langle \vec{X}_i(t) \rangle = 0$. The action of EQ 4 is shown schematically in FIG. 2, which illustrates the cumulative summation of the covariance matrix elements. The total nonlinear field variance after each span i is the sum of all elements within the corresponding i×i square covariance submatrix. Adding an additional, $(i+1)^{th}$ span requires addition of $2i-1$ elements Span-Count Dependence The span-count dependence of the summation of EQ 4, as depicted in FIG. 2, corresponds exactly with the degree of coherence that the nonlinear noise maintains from one span to the next.

For nonlinear induced noise that is not correlated from span to span, i.e. that adds incoherently, the off-diagonal covariance elements will be near zero, and the total nonlinear field variance will increase linearly with the number of spans (the length of the diagonal).

In contrast, for nonlinear induced noise that adds coherently, the off-diagonal covariance terms will be significant, and the noise will increase with the area shown in FIG. 2, which is proportional to the square of the number of spans.

Pearson Product-Moment Correlation Ratio

It is desirable to populate the covariance matrix using simple functions of signal and fiber characteristics. To this end, the Pearson product-moment correlation ratio, $$\rho(i, j) = \frac{\text{cov}(X_i, X_j)}{\sigma_i \sigma_j} \quad \text{EQ 5}$$

may be used. Note that the covariance matrix and Pearson correlation matrix are Hermitian (i.e. are equal to their conjugate transposes). Therefore, the sum of each pair of transposed elements is real, and the total nonlinear variance is given by:

$$\text{var}[X_N(t)] = \sum_{i=1}^{N} \sigma_i^2 + \sum_{j=1}^{N} \sum_{i \neq j}^{N} \rho(i, j) \sigma_i \sigma_j \quad \text{EQ 6}$$

$$= \sum_{i=1}^{N} \sigma_i^2 + 2 \sum_{j=1}^{N} \sum_{i=1}^{j-1} \text{Real}[\rho(i, j)] \sigma_i \sigma_j$$

where the second sum is over the upper triangular region of the Pearson correlation matrix (since the matrix is Hermitian). FIG. 2 is a schematic diagram showing Pearson correlation coefficients (ratios) relevant to the calculation of the covariance matrix elements.

Variance Addition—Channel-by-Channel

To obtain a value for the total nonlinear field variance in the case of multiple copropagating optical channels, the individual elements of EQ 6 must be also be summed over the contributions to the nonlinear field variance from each interfering pump channel. In this case, the correlation ratio $\rho(i, j)$ is different for the probe channel versus the pump channels, and also each pump channel correlation ratio $\rho(i, j)$ is different from every other pump channel. Therefore, it is desirable to construct the nonlinear variance contribution $\sigma_i^2$ each span i using separate contributions from within each span of:

Intra-channel nonlinearities $\sigma_{probe,i}^2$ including, for example, SPM.; and Inter-channel nonlinearities $\sigma_{pump,i}^2$ including, for example, XPM, XPolM, and FWM.

Figure 4:
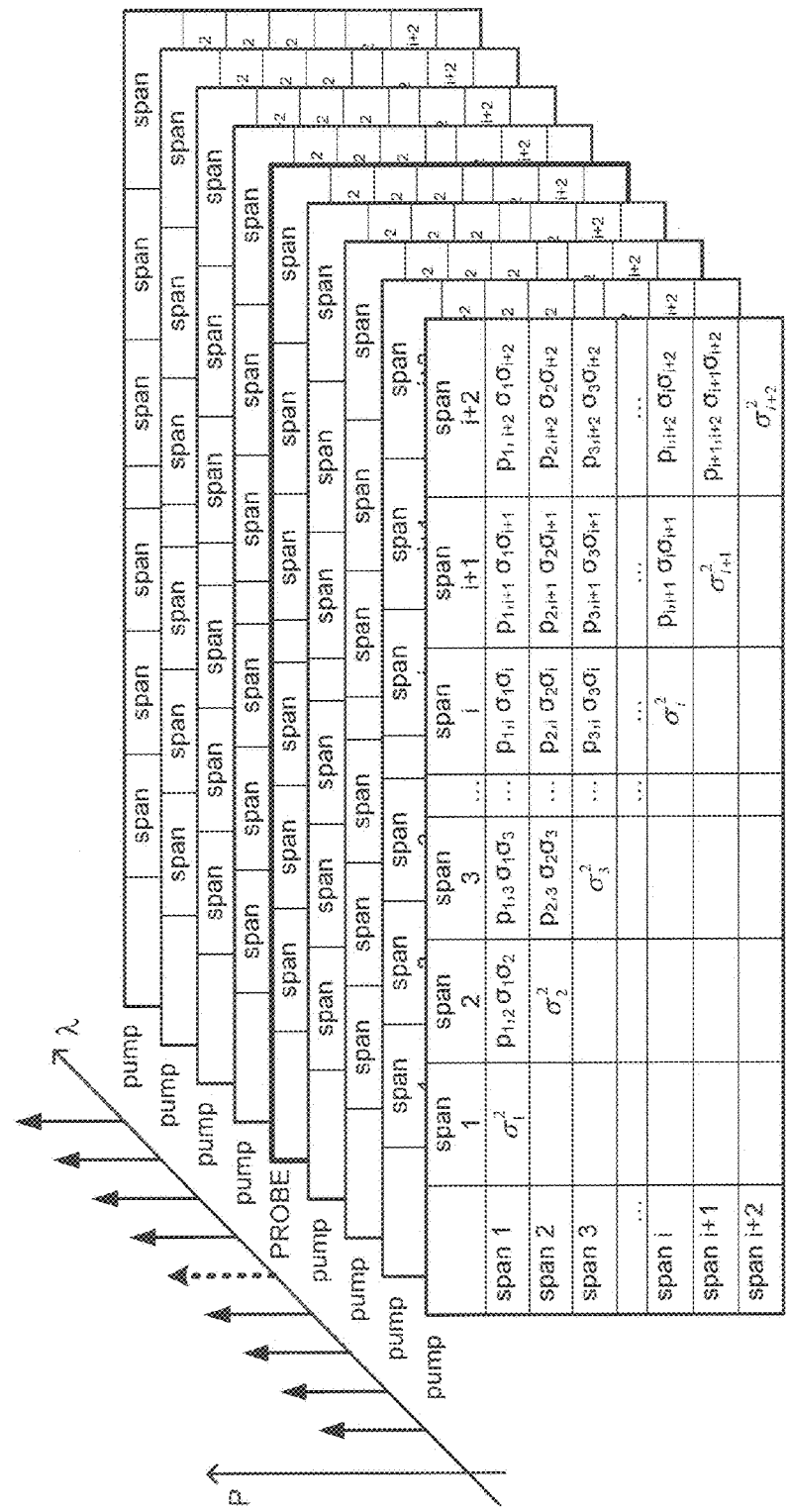
FIG. 4 schematically illustrates the Pearson correlation ratio and covariance matrices in a system comprising of a probe channel copropagating with multiple pump channels.

The covariance between the nonlinear fields generated between one span and the next is affected by the per-span variance and the correlation ratio according to EQ 6. So, the two terms of EQ 6 will themselves involve summations over nonlinear field contributions from all copropagating channels (pumps and probe) as shown in EQ 7:

$$\sigma_i^2 = \sigma_{probe,i}^2 + 2\sum_{j=1}^{N}\sum_{i=1}^{j-1} \text{Real}[\rho_{single}(i,j)]\sigma_{probe,i}\sigma_{probe,j} + \sum_{pump}\left(\sigma_{pump,i}^2 + 2\sum_{j=1}^{N}\sum_{i=1}^{j-1}\text{Real}[\rho_{pump}(i,j)]\sigma_{pump,i}\sigma_{pump,j}\right) \quad \text{EQ 7}$$

where $\rho_{single}$ and $\rho_{pump}$ are the Pearson correlation matrix entries for the intra-channel nonlinear processes (SPM) and inter-channel nonlinear processes contributed by the $p^{th}$ interfering pump channel (XPM, XPolM, FWM), respectively. This is shown schematically in FIG. 4.

Calculation of Covariance Matrix Elements

Summation of matrix elements, as in EQ 7, is typically a fast numerical operation. First, however, it is necessary to populate the covariance matrix. For rapid calculations, simple universal curves based on the fewest number of physical parameters are desirable. Although empirical functions may be used to derive the universal curves, functions that have a basis in physics enable easier and more intuitive application of the present technique to diverse system configurations.

It is preferable to utilize universal curves that can be used to populate the covariance matrices in the most efficient manner. Some candidate functions that may be used for this purpose are described below.

Experimental System

Using a standard, SSF solution of the NLSE (termed "waveform propagator" in what follows) as the nonlinear, physics-based, modelling tool, various configurations of propagating channels, fiber-types and launch powers were examined. The calculations were performed using the optical fields obtained from simulation before the application of a carrier phase estimation filter Typically, for multi-channel studies, only one pump channel was considered in a given propagation simulation. This is justified by comparing the arithmetic sum of nonlinear variances from a simulation involving only a single pump with the output of the waveform propagator run with many pumps at once, with a relevant figure reproduced in FIG. 5.

Figure 6:
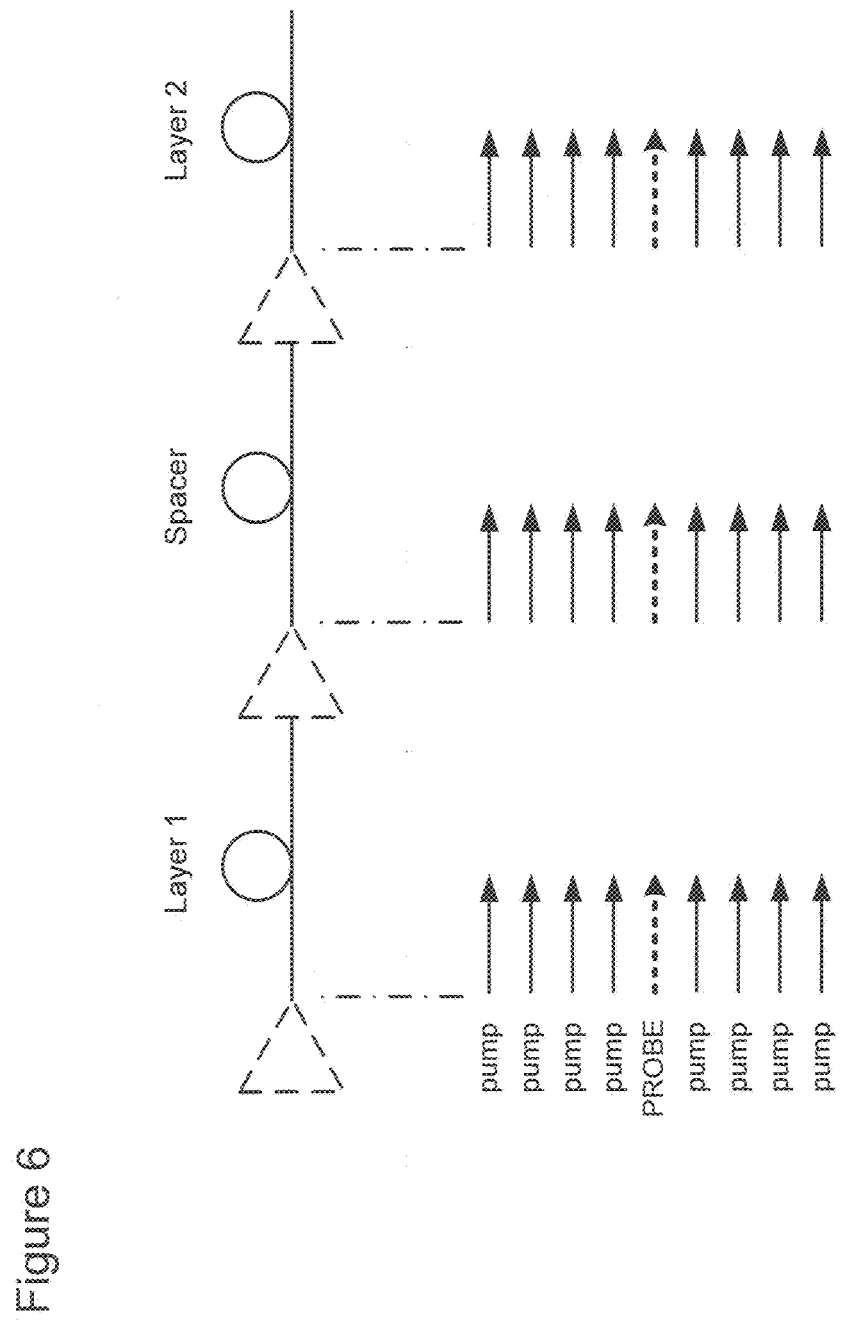
FIG. 6 is a schematic representation of a representative communication system of a type which may be evaluated using the Pearson correlation ratio and covariance matrices of FIG. 4.

To verify the covariance of the nonlinear field between spans, a system was constructed as shown in FIG. 6. Typically, only one pump channel was considered in a single propagation simulation.

The typical procedure varied the linear chromatic dispersion of a "spacer" layer, simulated with a sufficiently low input launch power, in order to isolate the covariance of the nonlinear fields generated in Layer1 and Layer2. The independent variable was either the total accumulated dispersion for the case of single-channel studies, or the total accumulated group-delay between the pump and probe channels for multi-channel studies.

An electronic precompensation of the optical chromatic dispersion was applied at the transmitter to each channel independently.

In all cases, the nonlinear optical fields, covariance matrices and Pearson correlation ratios were determined as described above.

Single-Channel Nonlinear Processes

A single optical transmission channel undergoes nonlinear change due to self-phase modulation (SPM), which occurs in every span. The dominant parameter affecting SPM is the total accumulated chromatic dispersion, including any electronic precompensation that the waveform has undergone before the span(s) of interest.

Single-Channel Per-Span Variance and Correlation Co-Efficient

Figures 7A, 7B:
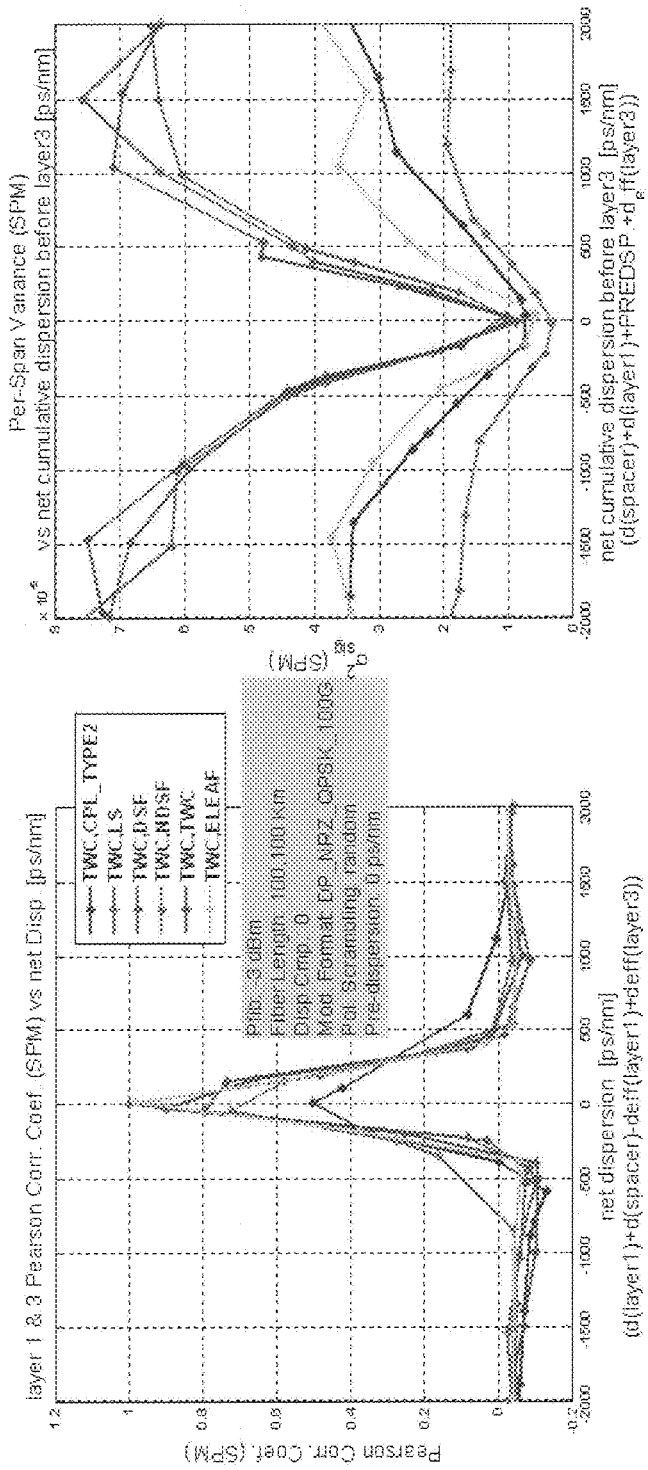
FIGS. 7A and 7B respectively illustrate representative universal curves for correlation ratio and per-span variance.

Diagonal elements of the covariance matrix correspond to the variance of the nonlinear optical field. Based on inspection of many nonlinear propagation calculations using the waveform propagator, the variance generated in any given fiber span is found to have a universal-curve behaviour illustrated in FIG. 7. FIG. 7 illustrates the universal curves for the Pearson correlation ratio and per-span variance for the case of a single propagating channel for six different optical transmission fiber types.

Multi-Channel Nonlinear Processes

The multi-channel nonlinear processes are typically dominated by the effects of cross-phase modulation (XPM) and cross-polarization modulation (XPolM).

Multi-Channel Per-Span Variance

Figure 8:
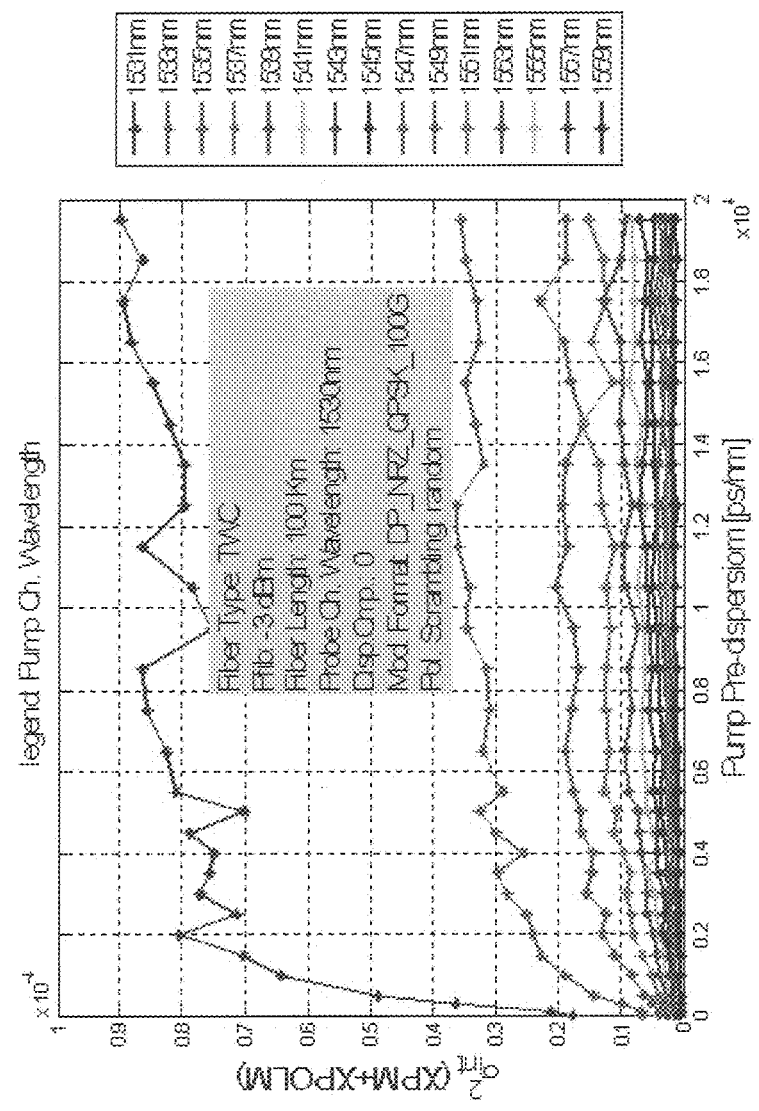
FIG. 8 illustrates an effect of pump-probe separation for TrueWave Classic (TWc) transmission fiber across a range of wavelengths.
Figure 9A:
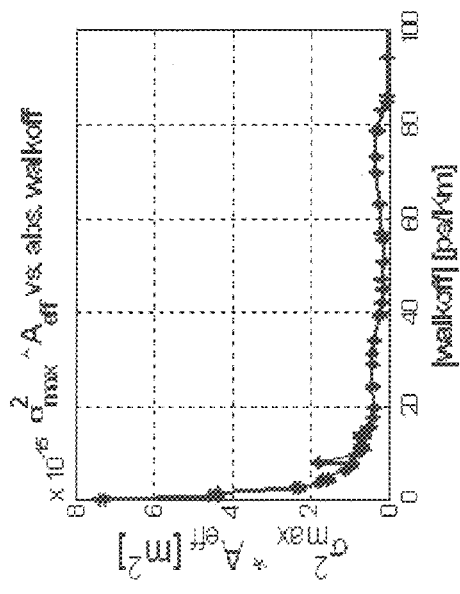
FIGS. 9A-9C illustrate respective universal curves for fitting constants versus the absolute value of the dispersive walk off.
Figure 9B:
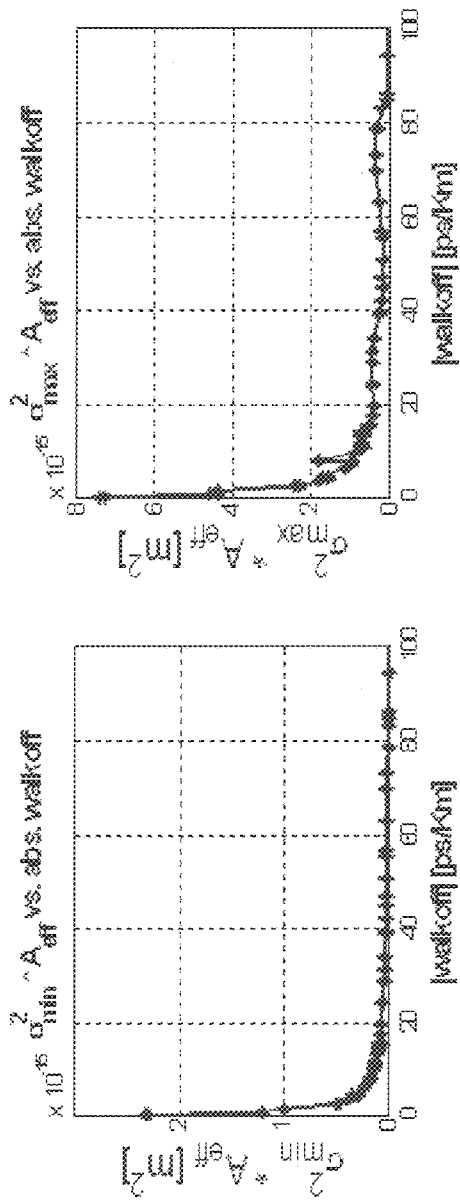
Figure 9C:
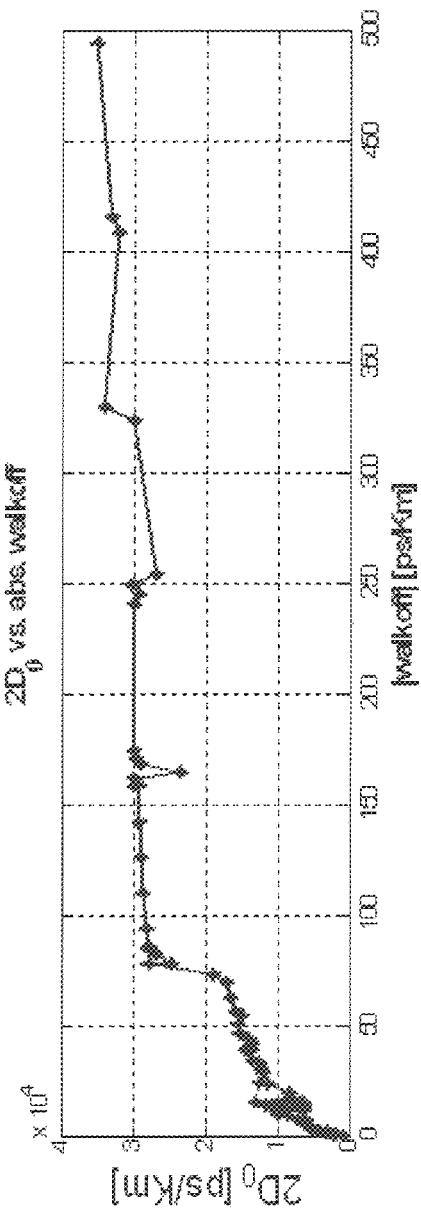

FIG. 8 illustrates the effect of pump-probe separation for TrueWave Classic (TWc) optical transmission fiber across a range of wavelengths covering the C-band. FIG. 9 illustrates universal curves for fitting constants versus the absolute value of the dispersive walk-off for many different fiber types and pump-probe separations.

Multi-Channel Correlation Coefficient

For multi-channel interactions, the Pearson correlation ratio $\rho_{multi}(i,j)$ relates the nonlinear XPM and XPolM field interactions occurring in span j with that generated previously in span i. Based on inspection of many nonlinear propagation calculations using the waveform propagator, the multi-channel correlation ratio is found to have two distinct universal-curve behaviours corresponding to configurations with either 1) positive dispersion and a positive dispersion-slope or 2) transitions between positive or negative dispersion between adjacent fiber spans.

Multi-Channel Correlation in Positive-Dispersion, Positive-Slope Fiber Spans

Figure 10:
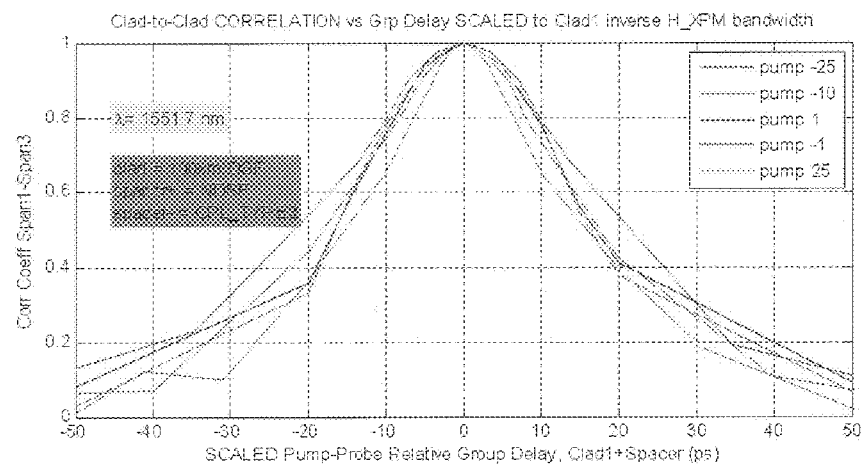
FIG. 10, illustrates a representative correlation ratio as a function of the relative group delay between the pump and probe in positive-dispersion, positive-slope fiber spans.

In positive-dispersion, positive-slope fiber spans, the Pearson correlation ratio relating the nonlinear optical field induced by a pump channel in differing fiber spans follows a bell-shaped dependence on the total group-delay accumulated from the start of the first span i to the start of the final span j. This behaviour is shown in FIG. 10.

Multi-Channel Correlation in Dispersion-Sign or Dispersion-Slope Changes

Figure 11:
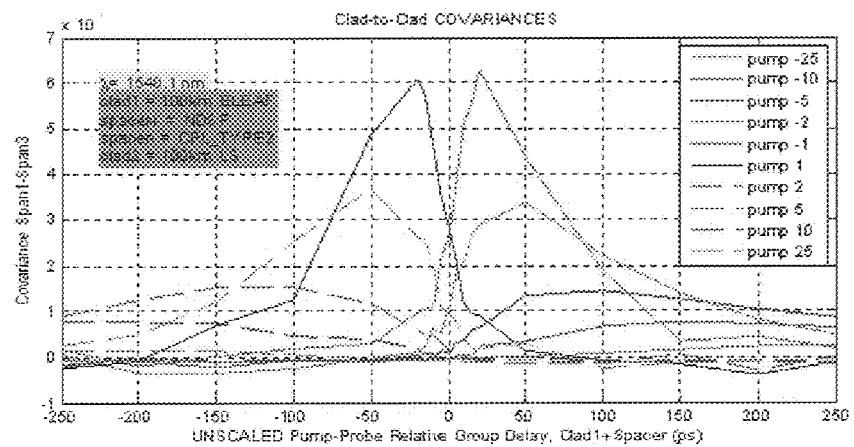
FIG. 11 illustrates representative universal curves for multi-channel correlation ratio as a function of the relative group delay between the pump and probe in the case of different dispersion slope or dispersion sign between spans.

FIG. 11 illustrates the universal curves for the Pearson correlation ratio obtained for multiple copropagating channels for the case of differing slopes or dispersion signs between adjacent fiber spans.

Power Scaling

The simplicity of the power-scaling of the nonlinear optical field variance provides strong conceptual motivation for using Pearson correlation ratios. The covariance matrix elements are calculated according to EQ 5, and since the Pearson correlation ratios are nominally independent of power, the off-diagonal covariance matrix elements scale with launch power in the same manner as the on-diagonal per-span variances.

Mixed Modulation Formats

It is expected that the transmission impairments induced by different combinations of modulation formats can be described using the techniques described herein. The difference in single and multi-channel nonlinear field variances is quantified by a set of universal curves applicable to the relevant modulation formats.

The embodiments of the invention described above are intended to be illustrative only. The scope of the invention is therefore intended to be limited solely by the scope of the appended claims.

We claim:

1. A method of estimating impairments of an Optical Channel (OCh) trail between a transmitter and a receiver in an optical communications network, the method comprising:
   computing a respective per-span nonlinear field variance for each span of the OCh trail, the per-span nonlinear field variance representing nonlinearly induced noise due to the transmission impairments of the respective span, the nonlinearly induced noise being imparted to a signal transmitted through the OCh trail and detected by the receiver;
   computing a respective covariance between the nonlinear fields contributed by each span pair of the OCh trail, the covariance representing the correlation of the nonlinearly induced noise imparted to the signal within the first span of a span pair with the nonlinearly induced noise imparted to the signal within the second span of the pair;
   populating a covariance matrix using the computed per-span variance values and covariance values; and
   computing a total nonlinear field variance by summing over the covariance matrix elements.

2. The method as claimed in claim 1, wherein the steps of computing respective per-span variances and covariances, and populating a covariance matrix are repeated for each type of transmission impairment, and wherein the step of computing a total nonlinear field variance comprises computing a sum over all respective elements of the relevant covariance matrices.

3. The method as claimed in claim 2, wherein the type of nonlinear impairment comprises any one or more of: self-phase modulation (SPM); cross-phase modulation (XPM); cross-polarization modulation (XPolM); and four wave mixing (FWM).

4. The method as claimed in claim 3, wherein the known properties of the signal comprise any one or more of:
   an accumulated chromatic dispersion of a waveform of the signal;
   a modulation format of the waveform; and
   a symbol rate of the signal.

5. The method as claimed in claim 3, wherein the known properties of the involved span comprise any one or more of:
   an effective core area of the fiber comprising each span;
   a respective chromatic dispersion of each span;
   a respective chromatic dispersion slope of each span; and
   respective accumulated relative group delays of the signal and any interfering signals between each span pair.

6. The method as claimed in claim 1, wherein the respective per-span nonlinear field variance for each span of the OCh trail is computed based on known properties of the signal and the involved span.

7. The method as claimed in claim 1, wherein computing the respective covariance for each span pair comprises computing a respective correlation ratio for each span pair, each correlation ratio defining a proportionality between the respective covariance of the span pair and the respective per-span variances of the involved spans.

8. The method as claimed in claim 7, wherein the respective correlation ratio for each span pair is derived based on known properties of the signal, each of the involved spans, and a type of transmission impairment.

9. The method as claimed in claim 8, wherein the type of impairment comprises any one or more of: self-phase modulation (SPM); cross phase modulation (XPM); cross polarization modulation (XPolM); and four wave mixing (FWM).

* * * * *